United States Patent Office

3,357,782
Patented Dec. 12, 1967

3,357,782
HYDRAZINIUM DYES, WITH MALEIC ACID OR ITS SALTS AND DYEING THEREWITH
Jose Carbonell, Viktor Sanahuja, and Hans Siegrist, Basel, Switzerland, assignors to Sandoz Ltd. (also known as Sandoz A.G.), Basel, Switzerland
No Drawing. Filed Jan. 20, 1964, Ser. No. 340,121
Claims priority, application Switzerland, Jan. 18, 1963, 613/63
13 Claims. (Cl. 8—25)

ABSTRACT OF THE DISCLOSURE

A process for the dyeing and printing of acrylonitrile polymerization products and linear aromatic polyesters with basic dyes containing a hydrazinium group in the presence of maleic acid or its salts.

---

This invention relates to a process for the dyeing or printing of textile fibres with basic dyes, which comprises the use of maleic acid and/or its salts as dyeing or printing assistants.

Examples of suitable maleic acid salts are, e.g., the monosodium, monopotassium, monoammonium, disodium, dipotassium or diammonium salts of maleic acid.

The present process is of special interest for the dyeing or printing of woven and knitted fabrics made of acrylonitrile polymerisation products or of linear aromatic polyesters or of polypropylene. For this purpose it is of advantage of use dyes of the formula

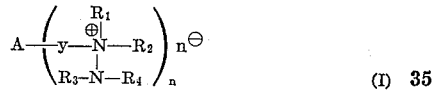

(I)

wherein A represents the radical of a dye, $y$ represents a substituted or unsubstituted alkylene group or a bridge member bound through such a group to the adjacent basic N atom, $R_1$ represents a substituted or unsubstituted alkyl, cycloalkyl or aralkyl radical, or together with $R_2$ and the adjacent N atom, a heterocyclic ring system, or together with the bridge member $y$ and the adjacent N atom, a heterocyclic ring system, $R_2$ represents a substituted or unsubstituted alkyl, cycloalkyl or aralkyl radical, or together with $R_1$ and the adjacent N atom, a heterocyclic ring system, $R_3$ and $R_4$ represent hydrogen or identical or different, substituted or unsubstituted alkyl, cycloalkyl or aralkyl radicals, or identical or different acyl radicals; or alternatively $R_1$ or $R_2$ together with $R_3$ or $R_4$ and the N atoms adjacent to these substituents can form a saturated or unsaturated 5- or 6-membered heterocycic ring; and $n$ represents an integer.

It is of advantage to use dyes of Formula I which are well soluble in water at about 80° C. Also it is advantageous to use dyes of Formula I which are free from anionic groups.

Woven and knitted fabrics of acrylonitrile polymerisation products can be dyed or printed by the process when dyes are used whose cationic character is determined by the presence of an ammonium or cycloammonium group or with dyes which are derived from the Fischer base.

Examples of dyes belonging to these types are the azo dyes which have one quaternizable, thiazol or benzothiazol group, and dyes of the same structure as the compounds of Formula I but which in place of the hydrazinium group contain an ammonium group. Also, dyes can be used which in addition to the hydrazinium group contain an ammonium or cycloammonium group. These cationic groupings can be present in the dye radical A.

Formula I above is to be understood as not restricted to the electromeric limiting state here indicated, but as comprising other electromeric structures.

In Formula I the bridge member $y$ can stand for a divalent radical, preferably a substituted or unsubstituted alkylene group or alkenyl group, or for a bridge member bound through such a group to the adjacent basic N atom; the substituted or unsubstituted alkylene or alkenyl group can be interrupted by hetero atoms such as nitrogen, oxygen or sulfur atoms. The following may be enumerated as examples: $-(CH_2)_p-$, where $p$ stands for an integer from 1 to 6.

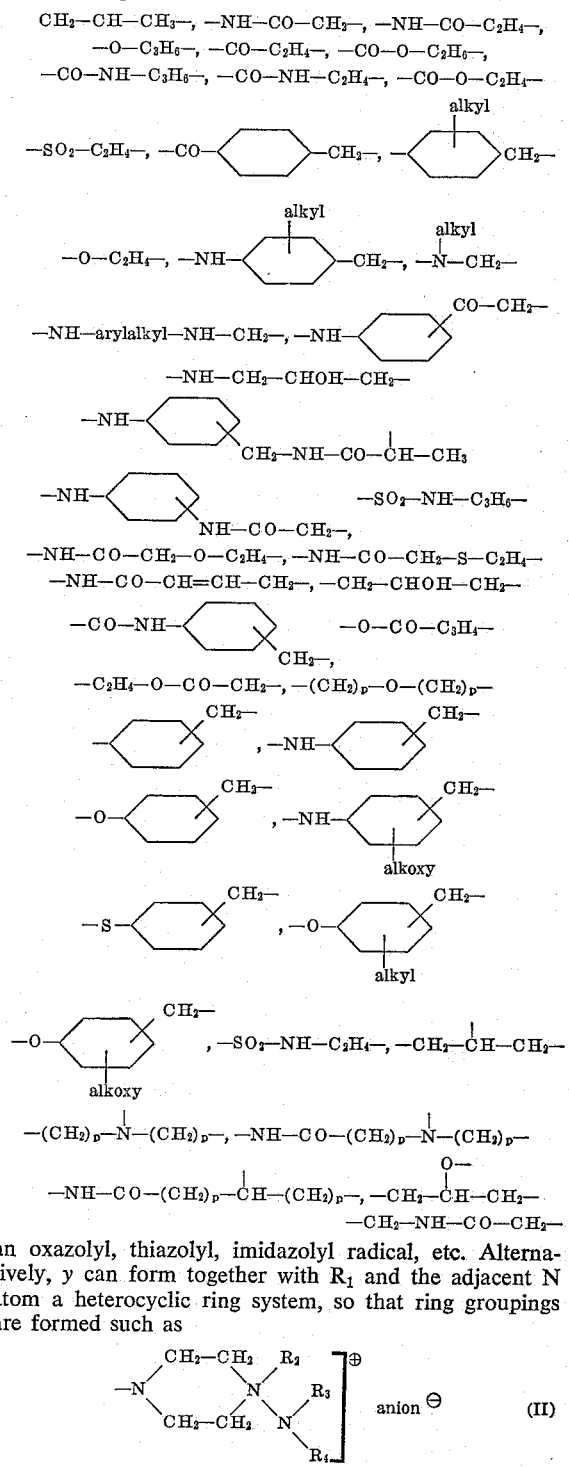

an oxazolyl, thiazolyl, imidazolyl radical, etc. Alternatively, $y$ can form together with $R_1$ and the adjacent N atom a heterocyclic ring system, so that ring groupings are formed such as (II)

Compounds of this type are obtainable, for example, by reaction of dihalogen compounds with hydrazines.

e.g.

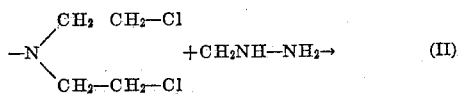

$R_1$ and $R_2$ together with the adjacent N atoms but without $y$ can also form a heterocyclic ring system, e.g., a pyrrolidine, piperidine ring, or an ethyleneimino grouping.

The grouping

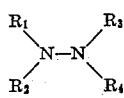

in Formula I signifies a hydrazine.

The preferred hydrazines are those which contain two hydrocarbon groups bound to the same nitrogen atom, such as N,N-dialkyl hydrazines which may be further substituted if desired, e.g., N,N-dimethyl, n-diethyl-, N,N-di-n-propyl-, N,N-di-isopropyl-, N,N-di-n-butyl-, N-methyl-N-ethyl-, N-methyl-N-n-propyl, N-methyl-N-n-butyl-, N-ethyl-N-n-propyl, N-ethyl-N-isopropyl-, N-methyl-N-β-hydroxy-ethyl-, N-ethyl-N-β-hydroxyethyl-, N-methyl-N-β-hydroxypropyl-, N-methyl-N-δ-hydroxypropyl-, N,N-di-(β-hydroxyethyl)- and N,N-di(β-hydroxypropyl)-hydrazine; N-alkyl-N-arylhydrazines which may be further substituted, e.g., N-methyl-N-phenyl-, N-methyl-N-4'-methylphenyl-, N-ethyl-N-phenyl- and N-β-hydroxyethyl-N-phenyl-hydrazine; the N-alkyl-N-cycloalkylhydrazines which may be further substituted, e.g., N-methyl-N-cyclohexyl-, N-ethyl-N-cyclohexyl-, N-methyl-N-4'-methylcyclohexyl- and N-β-hydroxyethyl-N-cyclohexyl-hydrazine; N,N-dicyclohexylhydrazine as an example of a N,N-dicycloalkylhydrazine; the N - alkyl - N-aralkyl-hydrazines which may be further substituted, e.g., N-methyl-N-benzyl-, N - ethyl - N - benzyl-, N - β - hydroxyethyl-N-benzyl-, N - methyl-N-phenylethyl-, N-ethyl-N-phenylethyl- and N-β-hydroxyethyl-N-phenylethylhydrazine; N,N-dibenzyl- and N,N-di-(phenylethyl)-hydrazines as example of N,N-di-aralkyl-hydrazines; tri- or tetra-alkylhydrazines which may be further substituted, e.g., N,N,N'-trimethyl-, N,N,N'-triethyl-, N,N-dimethyl-N'-ethyl-, N,N-diethyl-N' - methyl-, N-methyl-N,N'-diethyl-, N-ethyl-N,N'-dimethyl-, N,N-dimethyl-N'-n-propyl-, N,N-dimethyl-N'-n-butyl-, N,N - dimethyl-N'-β-hydroxyethyl-, N,N-diethyl-N'-β-hydroxyethyl, - N,N,N',N'-tetramethyl-, N,N,N',N' tetraethyl-, N,N-dimethyl-N',N'-diethyl- N,N-dimethyl-N',N' - di-(β-hydroxyethyl)-, N,N-dimethyl-N',N'-di-n-propyl-hydrazine; N,N-dimethyl-N'-phenyl-, N,N-dimethyl-N' - benzyl-, N,N-dimethyl-N'-phenylethyl-, N,N-dimethyl-N'-cyclohexyl-, N,N,N'-trimethyl-N'-phenyl-, N,N,N'-trimethyl-N'-benzylhydrazines, N-aminopiperidine, N-methylaminopiperidine, N-dimethylaminopiperidine, N-aminomorpholine, N-aminopyrrolidine, N-methylaminomorpholine and, N-dimethylaminomorpholine. The especially preferred hydrazine is N,N-dimethylhydrazine (asymmetrical dimethyl hydrazine) of the formula

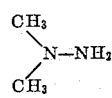

The acyl radicals $R_3$ and $R_4$ are preferably those of the formulae $R_6$—$SO_2$— or $R_6$—CO— where $R_6$ represents hydrogen or an aromatic or a saturated or unsaturated aliphatic or cycloaliphatic radical which with $R_4$ and N can form a ring; $R_3$ or $R_4$ can be, e.g., formyl, acetyl, propionyl, butyroyl, acryloyl, cyanacetyl, benzoyl, dimethylaminoacetyl, methylsulfonyl, substituted or unsubstituted phenyl sulfonyl, and $R_3$ and $R_4$ together can be, e.g., substituted or unsubstituted succinoyl, maleinoyl or phthaloyl.

The radical A can be a substituted or unsubstituted azo dye of the mono-, dis- or poly-azo series which contains metal atoms bound by coordination links, or a substituted or unsubstituted anthraquinone, triphenylmethane, cyanine, styryl, perinone, naphthoquinone, nitro, oxazine, thiazine, quinophthalone, azomethine, phthalocyanine or indigo dye.

The acrylonitrile polymerisation products which come into consideration for the process are the polymers having more thane 80% acrylonitrile, for example polyacrylonitrile, such as "Orlon," "Dralon" (registered trademarks), and copolymers composed of 80 to 90% acrylonitrile and 20 to 10% vinyl acetate, vinyl pyridine, methylacrylate or methyl methacrylate. Products of these types are sold under the following names, some of which are registered trademarks: "Acrilan" (copolymer of 85% acrylonitrile and 15% vinyl acetate or vinyl pyridine), "Orlon," "Dralon," "Courtelle," "Crylor," "Dynel" (copolymer of acrylonitrile and vinyl chloride according to "Rayon and Synthetic Textiles," page 63, January 1950), "Acrybell," "Daryl," "Daran," "Dolan," "Ducilon," "Exland," "Imelon," "Kanekalon," "Nitrolon," "Nyma 212," "Nymcrylon," "Nymerlon," "Panacryl," "Polacryl," "Prelana," "Redon," "Rolan," "Sniacryl," "Tacryl," "Vezel N," "Wolcrylon," etc.

The linear aromatic polyester fibers which can be dyed or printed by the process are these fibers themselves and the preferably modified, linear aromatic polyester fibers containing, e.g., acid groups such as sulfonic acid, carboxyl or nitrile groups.

The term "polyester fibers" refers to the commercially available textile materials which are marketed under the trade names "Dacron," "Terylene," "Diolon," "Tergal," "Terital," "Trevira," i.e., fibers made from the condenstation products of aromatic dicarboxylic acids and glycols, preferably ethylene glycol or aromatic alcohols, e.g., xylene glycol. "Dacron 64" polyester fiber is described in the periodical "Chemiefasern in Forschung und Entwicklung," vol. 13, No. 8, page 560 (1961) and is stated to be produced from a polymerisation product of polyester and sulfo-iso-phthalic acid.

The term "polypropylene fibers" refers to pure polypropylene and to polypropylene fibers modified by, e.g., the introduction of acid groups.

Dyeing is carried out advantageously in an aqueous medium. It is advisable to work in a neutral or acid medium at a pH value of 2 to 7 and at temperatures of 60–100° C., or preferably at the boil. Dyeing can also be carried out in enclosed equipment at higher temperatures and under pressure, for example at 102–120° C.

The dyes can be prepared for dyeing as follows: a basic dye, or a mixture of basic dyes, or a mixture of a basic dye and a disperse dye, is intimately mixed in a ball mill with a non-ionic assistant, e.g., dextrin, common salt, Glauber's salt or sugar. The necessary amount of maleic acid or its salt can be mixed with these components to give a stable dyeing preparation. Alternatively, maleic acid or its salt can be added separately to the dyebath.

The preparation is best pasted with acetic, formic, sulfuric or phosphoric acid or ammonium sulfate, and water at about 20–80° C. added to the paste with thorough stirring. The whole is boiled for a short time and diluted with water to a liquor ratio of 1:1 to 1:200, or preferably 1:3 to 1:100. Further acid is added, e.g., acetic or formic acid, and the salt of a strong base and a weak acid, e.g., sodium acetate, sodium formate, potassium formate, oxalate. The acrylonitrile polymerisation product or other material to be dyed is entered into the dyebath at 60° C. The bath is heated to 100° C. in 30 minutes and boiled for about 1 hour. The bath is heated to 100° C. in 30 minutes and boiled for about 1 hour. The goods are then rinsed and dried. The acrylonitrile polymerisation product can alternatively be treated for about 10–15 minutes at 60° C. in a bath of acetic or formic acid, before dyeing is carried out.

The dyed fibers, films, filaments, woven or knitted fabrics can be submitted to a heat treatment, e.g., steaming or exposure to dry heat at temperatures above 100°, or to an after treatment with acids, aldehydes, e.g., formaldehyde, oxidizing agents or anionic agents (softeners, antistatic agents, etc.). The dyeings and prints have good fastness properties including good fastness to light, washing, water milling, perspiration, sea water, pleating, dry rubbing and heat setting. Blended fabrics containing fibers of acrylonitrile polymerisation products or linear aromatic polyesters or polypropylene can be dyed or printed with very good results in this way.

The process is suitable for the production of dyeings in all depths to the saturation point of the fiber. Amounts of 0.005 to 20% dye or preferably 0.5 to 10%, calculated on the weight of the goods, are used. The addition of the maleic acid or its salt, calculated on the weight of the goods, is 0.001 to 40% or preferably 0.1 to 20%.

The dyeing assistants in general use can be included in the dyebath, e.g., levelling agents, fluorescent brightening agents, wetting agents or solvents for dyes, e.g., non-ionic agents of the alkyl or aryl polyglycol ether type, in amounts of 0.05–10% on the fiber weight, as well as salts such as Glauber's or common salt. The commercially available cationic and anionic retarding agents do not interfere with the dyeing process.

Certain of the commercially available basic, metal-sensitive dyes have to be dyed with the salts of bichromates. The basic dyes employed in the present process do not require the addition of a bichromate salt in dyeing or printing, but they can be applied in combination with metal-sensitive basic dyes even when bichromate salts are present in the medium for the latter components. Under such conditions the action of maleic acid or its salt remains unaffected.

The aforementioned textile materials can be printed by the conventional methods. The printing process herein disclosed is suitable for the production of prints of all depths; the printing pastes can contain 0.01 to 100 parts dyestuff per 1000 parts of paste, or preperably 5 to 40 parts per 1000 parts of the paste.

The proportion of the maleic acid or its salt used in printing is 0.002 to 200 parts or preferably 1 to 80 parts per 1000 parts of the printing paste.

The commonly used assistants for printing can be added to these printing pastes, for example, solvents for dyes such as urea, thiodiethylene glycol, butyl carbitol, glycerine; non-ionic assistants of the alkyl or aryl polyglycol ether type, thickening agents, fluorescent brightening agents, levelling agents, wetting agents, etc. Suitable thickening agents are gum tragacanth, locust bean gum and its derivatives, sodium alginates, starches and starch derivatives.

The polyacrylonitrile material can be padded on a two- or three-bowl pad by the normal method. The padded dye can be fixed by the pad-steam, Thermosol- or Pad-Roll processes; temperatures above 200° C., however do not appear to be advisable for this purpose.

The padding liquors can contain 0.5 to 100 parts of the mixture of dye and maleic acid or its salt, or preferably 5 to 50 parts of this mixture. The material is padded and expressed to a pick-up of 40 to 180%, or preferably 60 to 80%. The generally used padding assistants can be included in the liquor, e.g., wetting and levelling agents or solvents for dyes, such as non-ionic assistants of the alkyl or aryl polyglycol ether type.

Virtually all basic dyestuffs can be used as dyes of Formula I, such as those described in French Patent No. 1,325,176 and French Additional Patent No. 81,967 and in Belgian Patents Nos. 630,895 and 633,447.

In the following examples the parts and percentages are by weight and the temperatures in degrees centigrade.

Example 1

One part of the dye of the formula

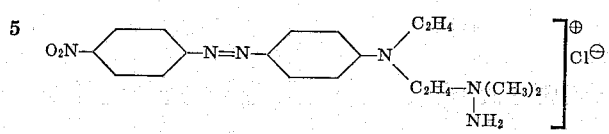

is mixed with 1 part of maleic acid and the mixture pasted with 2 parts of 20% formic acid. 40 parts of boiling water are run onto the paste with stirring until a good solution is obtained. The solution is boiled for a short time and then added to a solution of 0.4 part of sodium acetate and 4 parts of calcined Glauber's salt in 160 parts of water. The dyebath thus prepared is adjusted if necessary to a pH 4.5; the pH of the prepared dyebath can however vary from 2 to 7 as required.

The dyebath is heated to 50° and 20 parts of, e.g., "Dralon" (registered trademark), polyacrylonitrile fiber are entered. The bath is brought to 100° in 30 minutes and maintained at this temperature for 1½ hours. It is then cooled slowly and the goods rinsed and dried. The goods are dyed to a deep red shade which has very good light fastness, good wet fastness properties and excellent rubbing fastness.

The 20 parts of polyacrylonitrile fiber can be replaced by 20 parts of a linear aromatic polyester fiber, e.g., "Dacron 64," or by 20 parts of polypropylene fiber. The liquor ratio can range from 1:1 to 1:200 or preferably from 1:3 to 1:100.

When no maleic acid is used for pasting the dye, the resulting dyeing has considerably poorer rubbing fastness.

The same results are obtained when the material is dyed as yarn in the form cross-wound packages. When the dye is not pasted with maleic acid, the dyed yarn bleeds heavily in the rinsing water, whereas with this addition the rinsing water is left almost colorless.

1 part of maleic acid, as used in this example, can be replaced by 0.001 to 40% or preferably 0.1 to 20% maleic acid, calculated on the weight of the goods. Dyeings with these additions have excellent light, wet and rubbing fastness.

The 1 part of the dye of the above formula can be replaced by 0.005 to 20% of the same dye, calculated on the weight of the goods, or by any of the dyes disclosed in French Patent No. 1,325,176, Examples 1 to 183; French Additional Patent No. 81,967, Examples 1 to 209; Belgian Patent 630,895, Examples 1 to 170; or Belgian Patent 633,447, Examples 1 to 750. With these dyes dyeings are obtained on "Dralon" which have very good light and wet fastness properties and excellent rubbing fastness. All of these dyes can be applied in amounts of 0.005 to 20%, or preferably 0.5 to 10%, calculated on the weight of the goods.

Example 2

One part of the dye of the formula

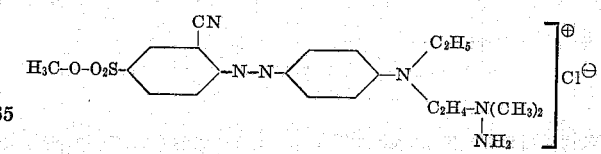

is mixed with 1 part of maleic acid and the mixing pasted with 2 parts of glacial acetic acid. 60 parts of boiling water are run onto the paste with stirring until a good solution is obtained. The solution is boiled for a short time and added to a solution of 0.6 part of sodium acetate and 6 parts of calcined Glauber's salt in 340 parts of water. The dye-bath thus prepared is adjusted to a pH value of 5.

60 parts of a blended yarn of 50% polyacrylonitrile fiber, e.g., "Orlon" (registered trademark), and 50% wool are entered into the dyebath at 50°. The bath is brought to the boil, the material dyed at this temperature for 2 hours, the bath cooled slowly, and the material rinsed and dried. The polyacrylonitrile component is dyed a deep ruby shade, while the wool is left practically undyed.

The 1 part of maleic acid used in this example can be replaced by 0.1 to 20% of maleic acid, calculated on the weight of the goods, or by the monosodium, monopotassium, monoammonium, disodium or dipotassium salt of maleic acid. The dyeings obtained have equally good light, wet and rubbing fastness.

When no maleic acid is used for parting the dye, the wool present in the dyebath is very heavily stained and the stain cannot be completely removed by rinsing.

The same results and the same dyeings are obtained when dyeing is carried out in autoclaves for 1 hour at 106°.

*Example 3*

One part of the dye used in Example 2 is mixed with 1 part of dextrin and the mixture pasted with 1 part of glacial acetic acid. 20 parts of boiling water are poured onto the paste with stirring, and the whole boiled for a short time to dissolve. This solution is added to a solution of 0.3 part of sodium acetate, 1 part of calcined Glauber's salt, 0.5 part of the diammonium salt of maleic acid, and 0.07 part of a technical alkylpolyglycol ether in 80 parts of water. The technical alkylpolyglycol ether is prepared by reacting a technical mixture of aliphatic alcohols having 16 to 18 carbon atoms with 22 to 25 moles of ethylene oxide.

The dyeliquor formed by the combined solutions is adjusted to pH 5 with acetic acid. It is applied on a jig to a fabric of 70% polyacrylonitrile fiber and 30% cotton. The initial temperature of the liquor is 60°; after each "end" or complete passage of the fabric through the jig the temperature is increased by 5° until it reaches 90°. The liquor is then brought very slowly to the boil and the material dyed at the boil for a further 2 hours. The liquor is allowed to cool slowly, and the goods are rinsed and dried. The polyacrylonitrile fabric is dyed to a deep ruby shade, while the cotton component in the blend is reserved practically white. The dyeing has excellent rubbing fastness.

When the fabric is jig dyed by this procedure but without the diammonium salt of maleic acid, the cotton component of the blend is appreciably stained. The rubbing fastness is inferior and the shade of the dyeing duller.

*Example 4*

One part of the dye used in Example 1 is mixed with 1 part of the disodium salt of maleic acid and 0.5 part of dextrin in the dry state and the mixture ground.

The stable preparation thus obtained is pasted with 2.5 parts of 20% formic acid and the paste added to 40 parts of boiling water with stirring until a good solution is obtained. The solution is boiled for a short time and added to a solution of 0.2 part of sodium sulphate and 15 parts of calcined Glauber's salt in 450 parts of water. The dyebath thus prepared is adjusted to pH 5 if necessary. It is then heated to 60° and 12.5 parts of a polyacrylonitrile fiber material, e.g., "Courtelle" (registered trademark) yarn, are introduced into the bath. The temperature is raised to 108° under pressure and dyeing continued for 1 hour at this temperature. The bath is then allowed to cool slowly and the goods rinsed and dried. The material is dyed to a deep red shade and with good light and wet fastness and excellent rubbing fastness.

In the absence of a disodium salt of maleic acid in the dyebath, the resulting dyeing is less fast to rubbing and duller in shade; also its washing fastness is insufficient, as is shown by the heavy bleeding of the dyeing in the rinsing water.

*Example 5*

One part of the dye used in Example 1 is mixed with 1.5 parts of the mono-potassium salt of maleic acid in the dry state and the mixture pasted with 2 parts of 40% acetic acid. 25 parts of boiling water are added to the paste with stirring until a good solution is obtained. This is boiled for a short time and then added to a solution of 5 parts of calcined Glauber's salt in 135 parts of water, to form a dyebath which is adjusted to pH 4. The dyebath is raised to 45° and 20 parts of a polyacrylonitrile fiber in yarn form are entered. The temperature is increased to 105° in 20 minutes under pressure and dyeing continued for 1 hour at this temperature. The bath is allowed to cool slowly and the goods rinsed and dried. A deep red dyeing is obtained which has good light, wet and rubbing fastness.

Without the addition of the monopotassium salt of maleic acid, the dyeing is not fast to rubbing and of dull shade.

*Example 6*

One part of the dye used in Example 1, 1 part of the dye used in Example 2, 2.5 parts of the dipotassium salt of maleic acid and 0.5 part of dextrin are mixed in the dry state, and the mixture pasted with 5 parts of 40% acetic acid. 100 parts of boiling water are run onto the paste with stirring until a good solution is obtained. This is boiled for a short time and added to a solution of 0.8 part of sodium acetate and 10 parts of calcined Glauber's salt in 600 parts of water, and the dyebath so prepared is adjusted to a pH value of 5 if necessary. It is then raised to 50° and 70 parts of a fabric of "Crylor" (registered trade mark) polyacrylonitrile fiber are entered. The bath is brought to the boil in 30 minutes and held at this temperature for 1 hour. It is then allowed to cool slowly, and the dyed fabric rinsed and dried. It is dyed to a level, deep bluish-red shade which has good light and wet fastness.

Without the use of the disodium salt of maleic acid, the dyeing is not fast to rubbing and bleeds in rinsing water, and its shade is duller.

*Example 7*

One part of the dye used in Example 2 or any one of the dyes disclosed in the French and Belgian patents cited in Example 1 is mixed with 3 parts of dextrin and the mixture pasted with 6 parts of 40% acetic acid and 2 parts of the monosodium salt of maleic acid and dissolved in 80 parts of water. This solution is added to a solution of 1 part of sodium acetate and 12 parts of common salt in 420 parts of water, and the dyebath thus prepared is adjusted to a pH value of 5. It is then heated to 50° in an autoclave and 65 parts of a worsted fabric of a polyacrylonitrile fiber, e.g. "Acrilan" (registered trade mark) (a polymer of 85% acrylonitrile and 15% vinyl acetate according to "Chemiefasern auf dem Weltmark" 8 Auflage, Apr. 1, 1960) are entered. Over the next 30 minutes the bath is raised to 108° under pressure and dyeing continued for 45 minutes at this temperature. The bath is then allowed to cool slowly and the goods rinsed and dried. The fabric is dyed to a deep ruby shade which has good light and wet fastness and excellent rubbing fastness. Without the addition of the monosodium salt of maleic acid the dyeing is not fast to rubbing.

*Example 8*

One part of the dye used in Example 1 or of any one of the dyes disclosed in the French and Belgian patents cited in Example 1 is mixed with 0.7 part of the monoammonium salt of maleic acid and 1 part of dextrin in the dry state, and the mixture ground and subsequently pasted with 2 parts of 40% acetic acid. The resulting preparation is added to 60 parts of boiling water with stirring until a good solution is obtained, which is boiled for a short time and then added to a solution of 5 parts of ammonium sulfate in 440 parts of water. The dyebath thus prepared is adjusted to a pH value of 4.5. It is then heated to 50° and 50 parts of a polyacrylonitrile fiber, e.g., "Orlon 42" (registered trademark) (acrylonitrile/2-vinylpyridine copolymer according to "American Dyestuff Reporter," P227, Apr. 9, 1956), are introduced. The bath is brought to the boil in 30 minutes and the goods dyed for 90 minutes at this temperature. The bath is then cooled slowly and the goods rinsed and dried. A deep ruby dyeing is obtained which shows good light, wet and rubbing fastness.

Common salt, Glauber's salt or sugar can be used in place of dextrin.

*Example 9*

One part of the dye used in Example 1 is pasted with 1.2 parts of the disodium salt of maleic acid, 0.4 part of dextrin and 1 part of 40% acetic acid. Separately, 0.2 part of the dye listed in the Colour Index as C.I. Disperse Blue 19, No. 61110, is mixed with 0.24 part of sodium dinaphthylmethanedisulfonate, and the mixture finely ground, jet dried and pasted with 4 parts of water at 10–15°.

The two pastes are added to a solution of 1 part of ammonium sulfate and 0.3 part of an alkylpolyglycol ether in 326 parts of water. The dyebath prepared in this way is adjusted to a pH value of 4.5; the pH value however can be varied from 2 to 7 as required.

The dyebath is raised to 50° and 20 parts of polyacrylonitrile fiber, e.g., "Courtelle" (registered trademark) knitted fabric are entered. The bath is brought to 100–102° in 30 minutes, if necessary under pressure, and dyeing carried out for 75 minutes at this temperature. The bath is then allowed to cool slowly and the goods rinsed and dried. The fabric is dyed to a deep reddish-blue shade which has very good light and wet fastness properties and excellent rubbing fastness.

When no disodium salt of maleic acid is used for posting the dye, the resulting dyeing has considerably poorer rubbing fastness and poor wet fastness, and the shade is duller and unlevel.

*Example 10*

The 0.2 part of the dye C.I. Disperse Blue 19 used in the preceding example is increased to 1.2 parts and the 20 parts of polyacrylonitrile fiber is replaced by the same weight of a blended knitting yarn containing 70% "Crylor" (registered trademark) polyacrylonitrile fiber and 30% cellulose triacetate or Nylon 66. This material is dyed as described in the preceding examples. The polyacrylonitrile component in the yarn is dyed to a deep red shade and the cellulose triacetate or Nylon 66 component to a blue shade, both of which have good light and wet fastness and excellent rubbing fastness.

Without the addition of the disodium salt of maleic acid the dyeings on the two components are not fast to rubbing and wet treatments and bleed in the rinsing water.

The 20 parts of polyacrylonitrile material can be replaced by 20 parts of a linear aromatic polyester fiber or 20 parts of polypropylene fiber. The liquor ratio can vary from 1:1 to 1:200, or preferably from 1:3 to 1:100.

The 1.2 parts of the disodium salt of maleic acid used in Examples 9 and 10 can be replaced by 0.001 to 40% or preferably 0.1 to 20% maleic or tartaric acid calculated on the weight of the goods, or by the equivalent amount of the monosodium, monopotassium, monoammonium, dipotassium or diammonium salt of maleic acid.

The 1 part of the basic dye used in Examples 9 and 10 can be replaced by 0.005 to 20% of the same dye, calculated on the weight of the goods, or by any desired amount of the dyes disclosed in the French and Belgian patents cited in Example 1, with which similar dyeings with the same good fastness properties are obtained.

Having thus disclosed the invention, what we claim is:

1. A process for dyeing or printing a textile fiber selected from the group consisting of an acrylonitrile polymerisation product and a linear aromatic polyester with an assistant and with a basic dye of the formula

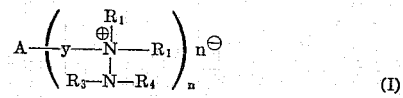

wherein

A represents the radical of a dye free from anionic groups,
y represents a member selected from the group consisting of an alkylene group and a bridge member bound through such a group to the adjacent basic N atom,
$R_1$ represents a members selected from the group consisting of an alkyl, cycloalkyl and aralkyl radical and, together with $R_2$ and the adjacent N atom, a heterocyclic ring system, and together with the bridge member y and the adjacent N atom, a heterocyclic ring system,
$R_2$ represents a member selected from the group consisting of an alkyl, cycloalkyl and aralkyl radical and, together with $R_1$ and the adjacent N atom a heterocyclic ring system,
each of $R_3$ and $R_4$ represents a member selected from the group consisting of hydrogen, an alkyl, cycloalkyl, aralkyl and acyl or both $R_3$ and $R_4$ together with $R_1$ and $R_2$ and the N-atoms adjacent these substituents represent a member selected from the group consisting of a saturated and an unsaturated 5- to 6-membered heterocyclic ring system
and n represents an integer from 1 to 2, wherein the assistant is a member selected from the group consisting of maleic acid and its salts; the acrylonitrile polymerization product is a polymer of at least 80% acrylonitrile having from 0 to 20% of a copolymer selected from the group consisting of vinyl acetate, vinyl pyridine, methacrylate and methyl methacrylate; and the linear aromatic polyester is a member selected from the group consisting of aromatic dicarboxylic acid/glycol condensation product and aromatic dicarboxylic acid/aromatic alcohol condensation product.

2. A process according to claim 1, wherein the assistant is a member selected from the group consisting of the monosodium-, monopotassium-, monoammonium-, disodium-, dipotassium- and diammonium salt of maleic acid.

3. A process according to claim 1, wherein the assistant is from 0.001 to 40% of a member selected from the group consisting of maleic acid and its salts, calculated on the weight of the textile fiber.

4. A process according to claim 1, wherein A in the dye of Formula I is the radical of a monoazo dye.

5. A process according to claim 1, wherein A in the dye of Formula I is the radical of an anthraquinone dye.

6. Acrylonitrile polymerisation products dyed by the dyeing process claimed in claim 1.

7. Acrylonitrile polymerisation products printed by the printing process claimed in claim 1.

8. Linear aromatic polyesters dyed by the dyeing process claimed in claim 1.

9. Linear aromatic polyesters printed by the printing process claimed in claim 1.

10. A process according to claim 1, which is effected with a stable dyeing preparation comprising (a) a member selected from the group consisting of a basic dye of Formula I, a mixture of basic dyes of said Formula I according to claim 1 and a mixture of a basic dye of said Formula I and a disperse dye and (b) a member selected from the group consisting of maleic acid and a salt thereof.

11. A stable dyeing preparation containing (a) a member selected from the group consisting of a basic dye of Formula I according to claim 1, a mixture of basic dyes of said Formula I and a mixture of a basic dye of said Formula I and a disperse dye and (b) a member selected from the group consisting of maleic acid and a salt thereof.

12. A process according to claim 1 wherein the fiber is an acrylonitrile polymerization product.

13. A process according to claim 12 wherein $y$ is a member selected from the group consisting of

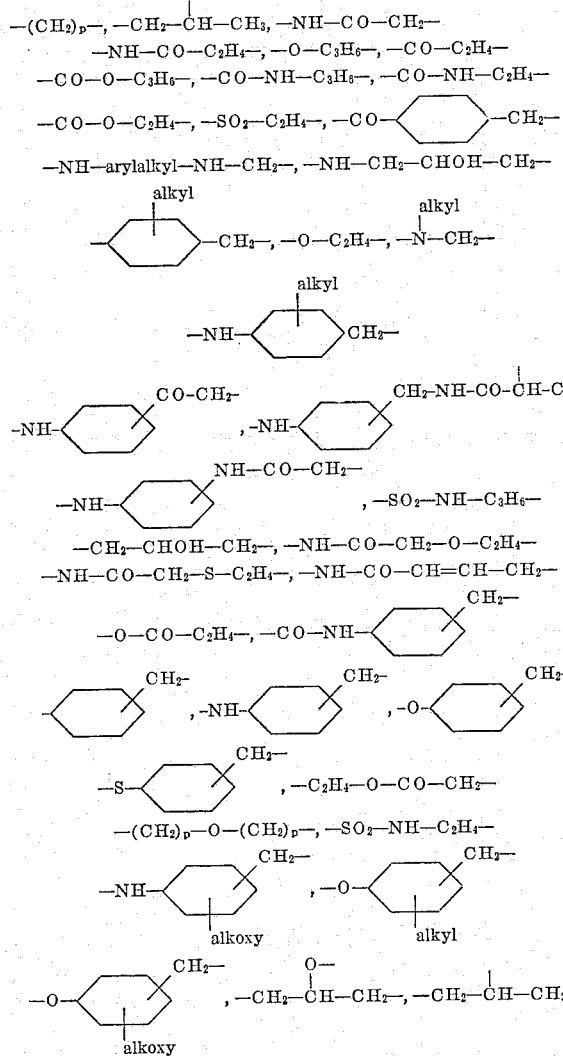

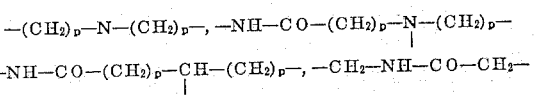

an oxazolyl radical, a thiazolyl radical, an imidazolyl radical and, together with $R_1$ and the adjacent N atom, a ring of the formula

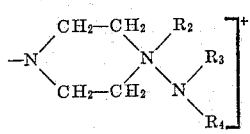

and $p$ is an integer from 1 to 6.

References Cited

UNITED STATES PATENTS

| | | | |
|---|---|---|---|
| 3,252,965 | 5/1966 | Entschel et al. | 8—55 |
| 3,252,967 | 5/1966 | Entschel et al. | 8—55 |
| 2,764,466 | 9/1956 | Bigood | 8—55 |
| 3,068,056 | 12/1962 | Coe | 8—55 |

FOREIGN PATENTS

| | | |
|---|---|---|
| 543,605 | 6/1956 | Belgium. |
| 1,342,828 | 10/1963 | France. |
| 1,312,183 | 11/1962 | France. |
| 633,160 | 12/1949 | Great Britain. |

OTHER REFERENCES

Moncrief: Man-Made Fibres, 4th ed., pp. 446, 469 and 471, pub. 1963 by John Wiley & Sons, Inc., New York, N.Y.

Diserens: Chemical Technology of Dyeing and Printing, vol. 2, p. 103, pub. 1951 by Reinhold Pub. Corp., New York.

Schmidlin: The Preparation and Dyeing of Synthetic Fibres, pp. 410–423, pub. Apr. 1, 1963, by Chapman-J. Hall Ltd., London, England.

Venkataramann: The Chemistry of Synthetic Dyes, pp. 1138–1140, vol. II, pub. 1952 by Academic Press Inc., New York, N.Y.

J. TRAVIS BROWN, *Primary Examiner.*

DONALD LEVY, *Examiner.*